(12) United States Patent
Kompalli et al.

(10) Patent No.: US 8,340,429 B2
(45) Date of Patent: Dec. 25, 2012

(54) SEARCHING DOCUMENT IMAGES

(75) Inventors: Suryaprakash Kompalli, Karnataka (IN); Ashwin Gopakumar, Kerala (IN)

(73) Assignee: Hewlett-Packard Development Company, LP, Houston, TX (US)

( * ) Notice: Subject to any disclaimer, the term of this patent is extended or adjusted under 35 U.S.C. 154(b) by 248 days.

(21) Appl. No.: 12/953,460

(22) Filed: Nov. 24, 2010

(65) Prior Publication Data

US 2012/0070073 A1    Mar. 22, 2012

(30) Foreign Application Priority Data

Sep. 18, 2010  (IN) ............................ 2736/CHE/2010

(51) Int. Cl.
*G06K 9/00*  (2006.01)
*G06K 9/54*  (2006.01)

(52) U.S. Cl. ........................ 382/187; 382/305
(58) Field of Classification Search ............... 382/187, 382/197, 198, 203
See application file for complete search history.

(56) References Cited

U.S. PATENT DOCUMENTS

| | | | |
|---|---|---|---|
| 6,633,868 B1 * | 10/2003 | Min et al. | ...................... 382/305 |
| 6,983,246 B2 | 1/2006 | Kepuska | |
| 7,016,532 B2 | 3/2006 | Boncyk | |
| 7,668,814 B2 | 2/2010 | Il | |
| 7,801,392 B2 | 9/2010 | Koyama | |
| 8,208,765 B2 * | 6/2012 | Wu et al. | ...................... 382/305 |

FOREIGN PATENT DOCUMENTS

WO    WO2005101192    10/2005

OTHER PUBLICATIONS (Ho, Tin, "A word shape analysis approach to lexicon based word recognition", Nov. 1992, Pattern Recognition Letters 13 (1992) 821-826).*

* cited by examiner

*Primary Examiner* — Bhavesh Mehta
*Assistant Examiner* — Totam Le

(57) ABSTRACT

Disclosed is a method of searching a digital image of a document for a predetermined keyword. The method identifies a word in the digital image, the word comprising one or more shapes. A test matrix comprising a difference vector for each character of the word is generated, and a template matrix comprising a difference vector for each shape of the keyword is also generated, wherein a difference vector represents the differences between the visual features of a respective shape and the visual features of a collection of reference shapes. A measure of similarity between the word and the keyword is generated by comparing the test matrix and the template matrix.

13 Claims, 7 Drawing Sheets

SEARCHING DOCUMENT IMAGES

RELATED APPLICATION

Benefit is claimed under 35 U.S.C. 119(a)-(d) to Foreign application Serial No. 2736/CHE/2010 entitled "SEARCHING DOCUMENT IMAGES" by Hewlett-Packard Development Company, L.P., filed on Sep. 18, 2010, which is herein incorporated in its entirety by reference for all purposes.

BACKGROUND

Organizations typically have large collections of paper documents. Such collections of documents may be stored in electronic data storage systems, wherein the documents are stored as digital images (i.e. electronic representations of the documents).

Searching collections of digital document images for documents containing a specific content, such as user defined text, can be difficult and time consuming.

An existing approach to searching digital document images for a specified keyword involves the use of optical character recognition (OCR) to extract text information from one or more digital document images. A keyword search is then performed on the extracted text information. This OCR-based technique is prone to OCR errors, especially for low quality document images

BRIEF DESCRIPTION OF THE EMBODIMENTS

Embodiments are described in more detail and by way of non-limiting examples with reference to the accompanying drawings, wherein FIG. 1 is a flow diagram of a document image searching method according to an embodiment;

DETAILED DESCRIPTION

Figure 1:
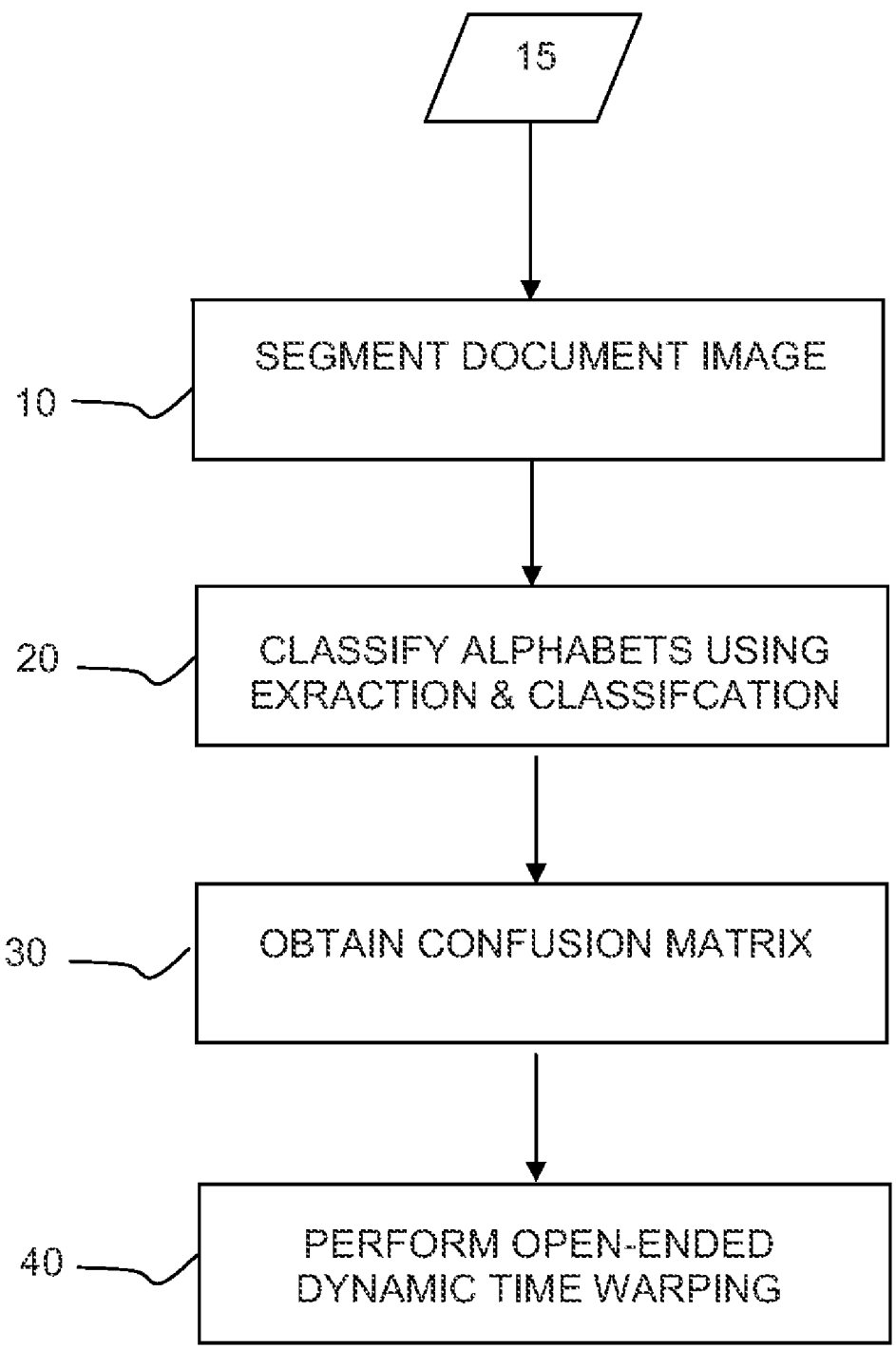

It should be understood that the Figures are merely schematic and are not drawn to scale. It should also be understood that the same reference numerals are used throughout the Figures to indicate the same or similar parts.

There is proposed a method of searching a collection of document images for a predetermined keyword.

According to an embodiment, there is provided a method of searching a digital image of a document for a predetermined keyword comprising one more keyword shapes, the method comprising the steps of: using a computer, identifying a word in the digital image, the word comprising one or more shapes; using a computer, generating a test matrix comprising a difference vector for each shape of the word, a difference vector representing the differences between the visual features of a respective shape and the visual features of a collection of reference shapes; using a computer, generating a template matrix comprising a difference vector for each keyword shape of the keyword; and using a computer, determining a measure of similarity between the word and the keyword by comparing the test matrix and the template matrix.

The proposed method may search for a partially specified keyword. In other words, it may implement keyword searching with 'wild cards'. By way of example, given a document image collection and a user specified keyword 'March*', where the character "*" is a wildcard, the proposed method can identify all document images containing words that begin with 'March'. The proposed method may also cater for keywords containing a plurality of wildcards at arbitrary positions. Examples of wildcards that may be catered for include the characters "*" and "?", allowing exemplary keywords such as:

Hp-Inv-01*
joh?????@hp.com
john.do?@hp.com
*voice*

Embodiments may use Dynamic Time Warping (DTW), or Open-Ended Dynamic Time Warping (OEDTW) for implementing keyword spotting.

FIG. 1 depicts a flow diagram of a method of searching a digital image of a document according to an embodiment.

In the first step 10, an input document image 15 is segmented into smaller components such as words, characters or sub-shapes of characters. Here, the whole document image is first segmented into lines, and each line is then segmented into word images. The word images are then finally segmented to individual character or sub-character images using connected component analysis. This segmentation process can be performed by any of several known methods which are reported in literature, such as 'Document Image Segmentation as Selection of Voronoi Edges' by Kise, K., Sato, A. and Matsumoto, K. (Workshop on Document Image Analysis, No. 32) for example. Next, in step 20, the segmented components are processed using a feature extraction and classification method.

Here, each character image from a word image is passed through a feature extraction and classification process. In the current example, the known MQDF classification process (as described in the document entitled "A Handwritten Character Recognition System Using Directional Element Feature and Asymmetric Mahalanobis Distance" by Kato (IEEE, 1999)) is used, but any other known feature extraction and classification process may be used to obtain such a mapping from alphabets to classifier scores. Here, the embodiment does not divide a character image into smaller parts to compute features and perform matching. It should be understood that alternative embodiments may perform feature extraction and classification on segments or parts of characters instead of whole characters.

Features are extracted from each character image. These features are then passed to the classification process where they are compared with model features that represent a set of idealised images (referred to as character classes) in training data. Based on the comparison, each extracted character is given a set of scores corresponding to the determined differences between the features of the extracted character and the model features of the character classes. In this example, there are sixty-nine (69) character classes corresponding to a-z, A-Z, 0-9 and seven special characters. Thus, the output of the classification process is a difference vector with sixty-nine (69) class values (one class value for each comparison with a respective character class), each value representing the difference between the features of the extracted character image and the feature of one of the character classes. Here, the class value representing the smallest difference is considered to be the class that matches closely with the extracted character image.

With the feature extraction and classification process repeated for all characters of a word image, the method step 20 generates a test matrix for a word image, wherein each row in the matrix comprises a difference vector for a respective character of the word.

The method then continues to step 30 in which the results from the previous step 20 are analyzed to obtain a confusion matrix.

A validation set of images is used to determine a confusion matrix ConfM. Each entry ConfM(i, j) of this matrix represents the probability that an image of class i has been incorrectly classified as class j (in other words, the probability that an image of a class has been confused). For example, if an image of the character "A" is presented to the classification process and the lowest difference value is obtained for class "B", the classification process is considered to have misclassified the character "A" as a character "B". Using such an analysis, one can determine the probability of confusion for each class.

This obtained confusion matrix is used to map an input keyword (including any wildcards) to a template matrix. For example, an input ASCII keyword may be represented in terms of the classifier confusions which are then passed as a template matrix to the final step (the DTW stage) of the method.

The final step of the method, step 40, comprises performing open-ended DTW to compare the template matrix with the test matrix. The DTW algorithm may be adapted to accommodate wildcard characters.

For improved understanding, step 40 of the method of FIG. 1 will now be described in more detail.

Dynamic Time Warping (DTW) is a method by which an input and a template set of feature vectors (i.e. a row of a template matrix) are compared and their warping distance determined. It provides a measure of the similarity or dissimilarity of two vectors. It also accommodates missing entries in the vectors by stretching or shrinking the two vectors.

Figure 2:
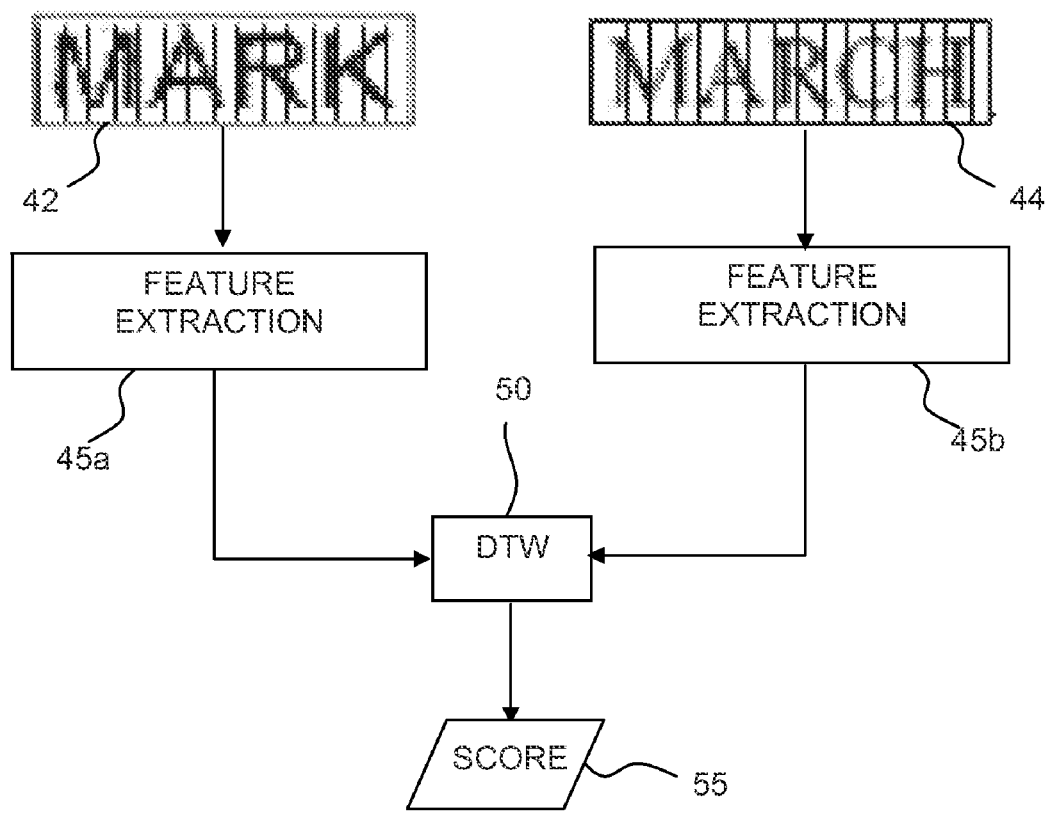
FIG. 2 depicts the comparison of word images using a Dynamic Time Warping method according to prior art.

FIG. 2 shows a representation of a known process of matching words using DTW. First 42 and second 44 segmented word images are provided to first 45a and second 45b feature extraction processes, respectively. The word images are segmented into equally sized sections rather than the individual characters making up the words. The first 45a and second 45b feature extraction processes extract the features of the segments of the first 42 and second 44 segmented word images and provides the extracted feature to a DTW process 50. The DTW process 50 compares the extracted features of the first 42 and second 44 segmented word images to determine their similarity. The determined similarity is output as a score 55 representing the degree of similarity of the first 42 and second 44 segmented word images.

In a DTW process, the DTW distance between two vectors x and y is calculated by first obtaining a DTW distance matrix (D). The distance value at each entry D(i, j) of the matrix is found by equation 1:

$$D(i,j) = \min(D(i,j-1), D(i-1,j), D(i-1,j-1) + d(xi=yi)),\quad(1)$$

where D(i,j) represents the total DTW distance at node (i,j) and d(Xi+Yj) is the node cost between ith entry of vector x and the jth entry of vector y. This distance d is found using a suitable distance measure such as the Euclidean distance.

Finally, D(M,N) gives the final DTW distance value 55 for the 2 signals where M is the length of vector x and N is the length of vector y.

Typically, in DTW problem definitions, the vector x is a test sample, and the other vector y is from a training set. Thus, multiple vectors from the training set are matched with x, and the vector y with the lowest score D(M, N) is selected as the closest match to x.

The DTW matrix values may be biased against longer matching vectors. So to eliminate this bias, the final matching cost may be normalized by dividing it by length of the warping path. The DTW optimal warping path (OWP) is the path from entry (0,0) to entry (M,N) in the DTW matrix such that each position along the path is associated with the least cost. Backtracking along the minimum cost pairs (i,j) starting from (M,N) yields the OWP. Thus, the finalized normalized cost Dnorm(M,N) of DTW matching may be represented as Equation 2:

$$D\mathrm{norm}(M,N) = D(M,N)/K,\quad(2)$$

where K is length of the OWP.

The DTW matching method given above can be extended to take into account variants of keywords. After generating the DTW matrix from the two sets of feature vectors, the OWP is found. The beginning and ending parts of OWP are analyzed to examine large changes in the cost along the path. While matching keyword with an image of a variant of the keyword with prefix/suffix, the cost will be higher at the beginning/end of the OWP. So to remove this additional cost, the cost at the beginning and end sections of the warping path is compared to the cost at the middle and if found to be much higher, this additional cost is removed from the final cost.

Figure 3:
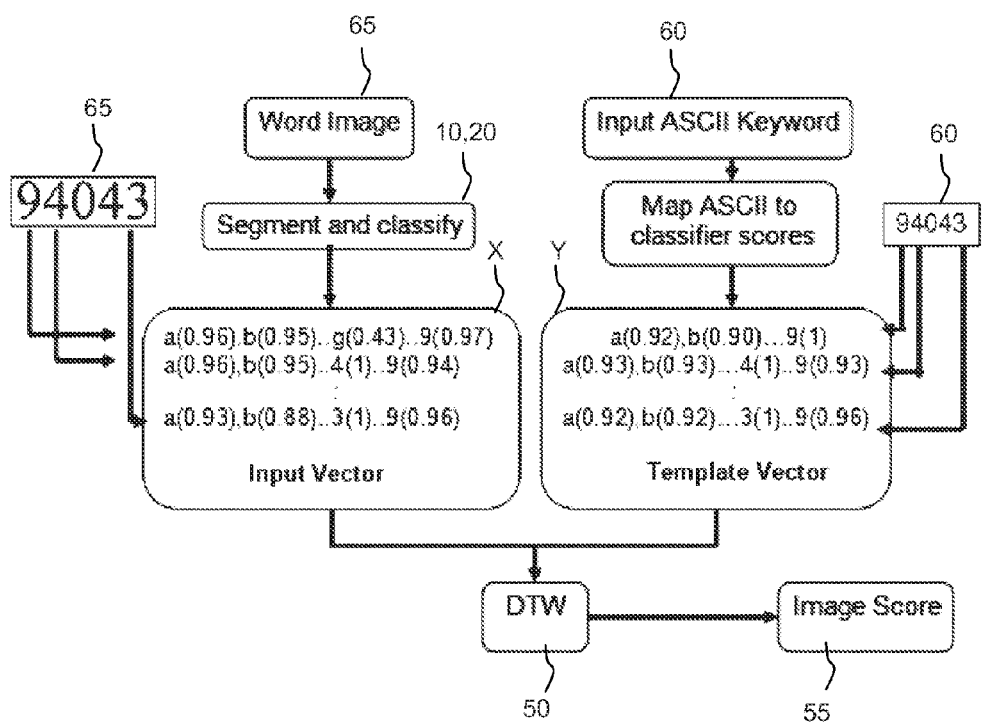
FIG. 3 depicts a method of comparing an image of a word with an ASCII keyword according to an embodiment.

FIG. 3 illustrates the use of DTW according to an embodiment, wherein no template image is used in processing an input word image. Instead, an input ASCII keyword 60 (for example, a user defined search query) is converted into the template matrix Y using a classifier confusion matrix, and classifier confidences obtained from word images 65 in a document are used as the test matrix X. Here, the template matrix Y is obtained by mapping the input ASCII keyword 60 to classifier confusions, and the test matrix X is obtained by passing the word image 65 from a document through the segmentation 10 and classification 20 steps of the method of FIG. 1.

The template matrix Y is obtained from the input ASCII keyword 60 which is mapped to the classifier confusions. The template matrix Y comprises a difference vector for each character of the input ASCII keyword 60. Each difference vector of the template matrix Y comprises sixty-nine entries, wherein each entry value represents the difference between the features of the respective character of the input ASCII keyword and the features of a character class. Here, the number of classifier classes is sixty-nine (69), corresponding to a-z, A-Z and 0-9, hence the length of each difference vector being sixty-nine (69).

Accordingly, given an input ASCII keyword $S=[S_0 S_1 S_2 \ldots S_n]$, we derive a template matrix $Y=[y_0, y_1, \ldots y_n]$ corresponding to S by mapping with the classifier scores:

$y_0 = [M(a|S_0), M(b|S_0) \ldots M(9|S_0)]$,
$y_1 = [M(a|S_1), M(b|S_1) \ldots M(9|S_1)] \ldots$
$y_n = [M(a|S_n), M(b|S_n) \ldots M(9|S_n)]$ where $M(\alpha|\beta)$ is a measure of the classification process output scores representing the difference between the features of an input ASCII character $\beta$ and the features of a character class $\alpha$.

By using different measures for M( ), different types of template vectors may be obtained. For example:

Binary Vector: where a value of 1 is given to the character class which matches that of an input character image, and where a value of 0 is given to the remaining character classes that do not match the input character image. For example, a Binary difference vector b for input ASCII character "b" may be represented as b=[a(0), b(1), c(0), d(0) . . . 9(0)].

Classifier Confusions: Obtained by analyzing top-n classifier results for test image sets. For example, a Classifier Confusion difference vector b for an input ASCII character "b" may be represented as b=[a(0.06), b(0.88), . . . 9(0.05)].

Confidence Matrix: Obtained by taking average of classifier scores output for test image sets. For example, multiple images of "B" can be input to a classification process, and average value of the score obtained at all the output locations would be measured. This will give 69 values that correspond to the confidence matrix of "B". Typically, in such a matrix, one would expect the value to be high at the output corresponding to "B" and low elsewhere. For example, a confidence-based difference vector b for an input ASCII character "b" may be represented as b=[a(0.25), b(0.43), . . . 9(0.27)].

Further, for the case of search queries containing wildcards such as "?" or "*", the vector corresponding to the wildcard character is assigned the value zero (0) at all positions. Thus, a difference vector for an input image of a "?" or a "*" character may be represented as [a(0), b(0), . . . 9(0)] (i.e. a null or zero vector).

The test matrix X is obtained from a word image 65 (obtained from a document image) 40. The test matrix X comprises a difference vector for each character of the word image 65. Similarly to the template matrix Y, each difference vector of the test matrix X comprises sixty-nine entries, wherein each entry value represents the difference between the features of the respective character of the word image 65 and the features of a character class.

Accordingly, given an input word image $T=[T_0 T_1 T_2 \ldots T_n]$, we derive a test matrix $X=[x_0, x_1, \ldots x_n]$ corresponding to S by mapping with the classification scores:

$x_0 = [M(a|T_0), M(b|T_0) \ldots M(9|T_0)]$,
$x_1 = [M(a|T_1), M(b|T_1) \ldots M(9|T_1)] \ldots$
$x_n = [M(a|T_n), M(b|T_n) \ldots M(9|T_n)]$ where $M(\alpha|\beta)$ is a measure of the classification process output scores representing the difference between the features of an image of a character $\beta$ and the features of a character class $\alpha$.

By using different measures for M( ), different types of template difference vectors of the text matrix X may be obtained. For example:

Classifier Scores: This is obtained by using the entire classifier confidence output for each connected component. For example, a Classifier-based difference vector b for an input image of a "b" character may be represented as b=[a(0.88), b(0.1), . . . 9(0.93)].

Binary Vector: where a value of 1 is given to the character class which matches that of an input character image (i.e. that with the highest score), and where a value of 0 is given to the remaining character classes that do not match the input character image. For example, a Binary difference vector b for an input image of a "b" character may be represented as b=[a(0), b(1), c(0) . . . 9(0)].

The template and the input matrices are then compared using a DTW method step 50 to produce a final DTW distance value 55 for the two inputs 60 and 65.

It will be appreciated that embodiments may use different combinations of different types of template and test vectors.

Figure 4:
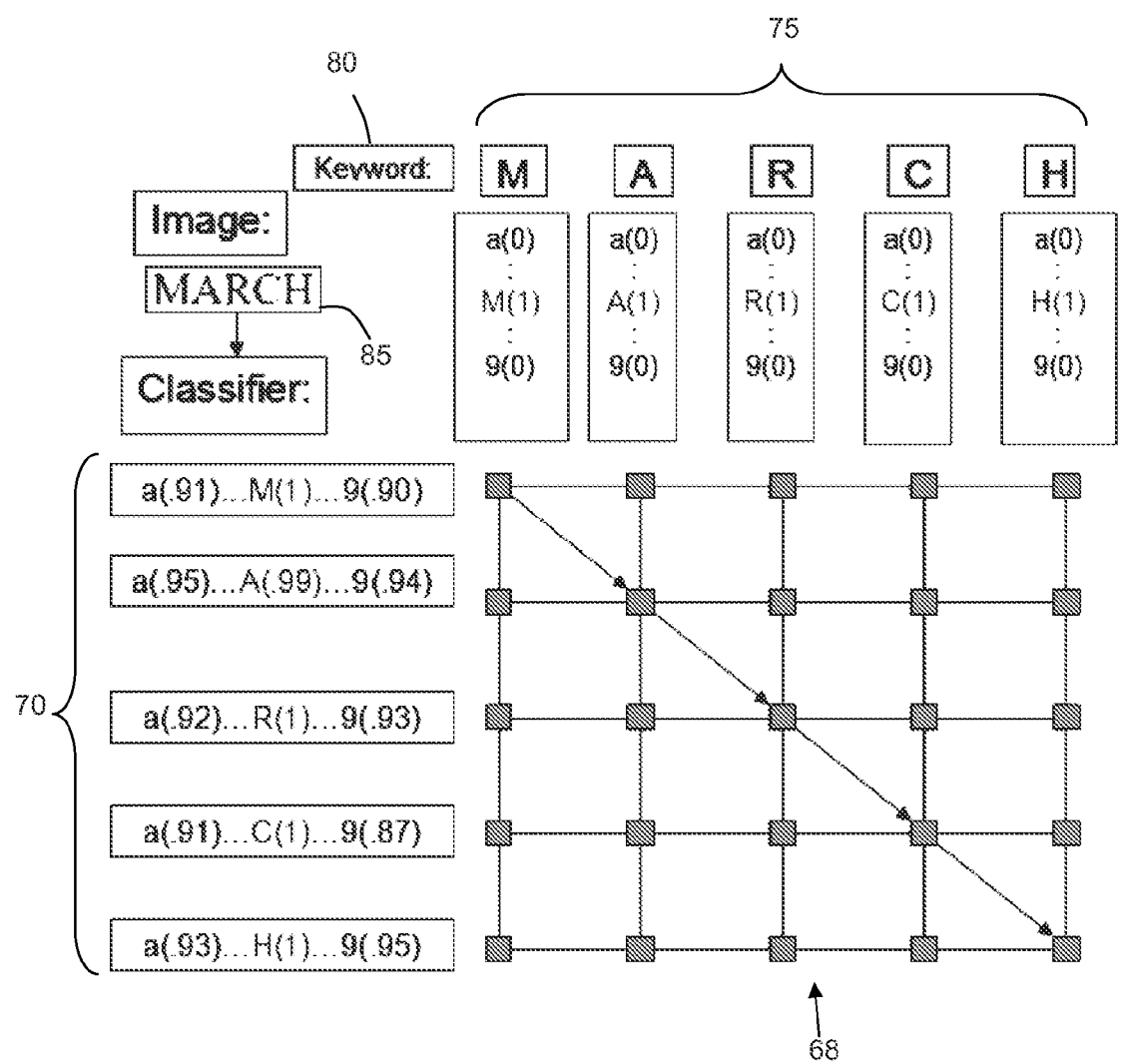
FIG. 4 illustrates matching template and test matrices according to an embodiment.

FIG. 4 illustrates a scoring grid 68 for matching template 70 and test 75 matrices obtained from a user specified ASCII keyword 80 and a word image 85 extracted from a document image. Each cell in the grid 68 is computed using a node cost as a measure of DTW distance. As will be known to the skilled reader, the node cost can be calculated using a suitable distance metric such as the Euclidean distance.

It will be seen that the best matched vectors can be plotted as an optimal warping path (i.e. lowest cost value of the DTW match). For example, in FIG. 4 the optimal warping path of the DTW is along the diagonal.

As mentioned above, embodiments may cater for input search queries including wildcard characters. One embodiment caters for such wildcard characters by assigning constant value to a node cost $d(c_i, s_j)$, where $s_j$ corresponds to the vector generated from the wildcard character (such as "*" or "?" for example).

For the case of the wildcard character being "?", a penalty may be added at the DTW cost computation stage when more than one character class is matched to the "?", but no such penalty is added in case of the "*".

The final DTW distance output may be normalized by dividing the computed cost by the minimum of the lengths of test vector and template vector. Alternatively, the distance output may be normalized by dividing the computed cost by the number of diagonal moves in the optimal warping path. Such normalization may help to prevent incorrect matching of keywords with short word images.

An alternative implementation for DTW with search queries including wildcard characters comprises the step of splitting the search query into different parts based on the location(s) of the wildcard character(s) and then matching each part of the search query separately. Such an embodiment may use different approaches depending on the number and/or location of wildcard characters. For example, a first approach may be used for search queries containing a single wildcard character as a first or last character (for example, search queries like "str*" or "*str"). A second, alternative approach may then be used for search queries containing two wildcard characters separated by one or more normal/accepted characters (for example, search queries like "*str*").

First Approach (for Search Queries Like "str*" or "*str")

Figure 5:
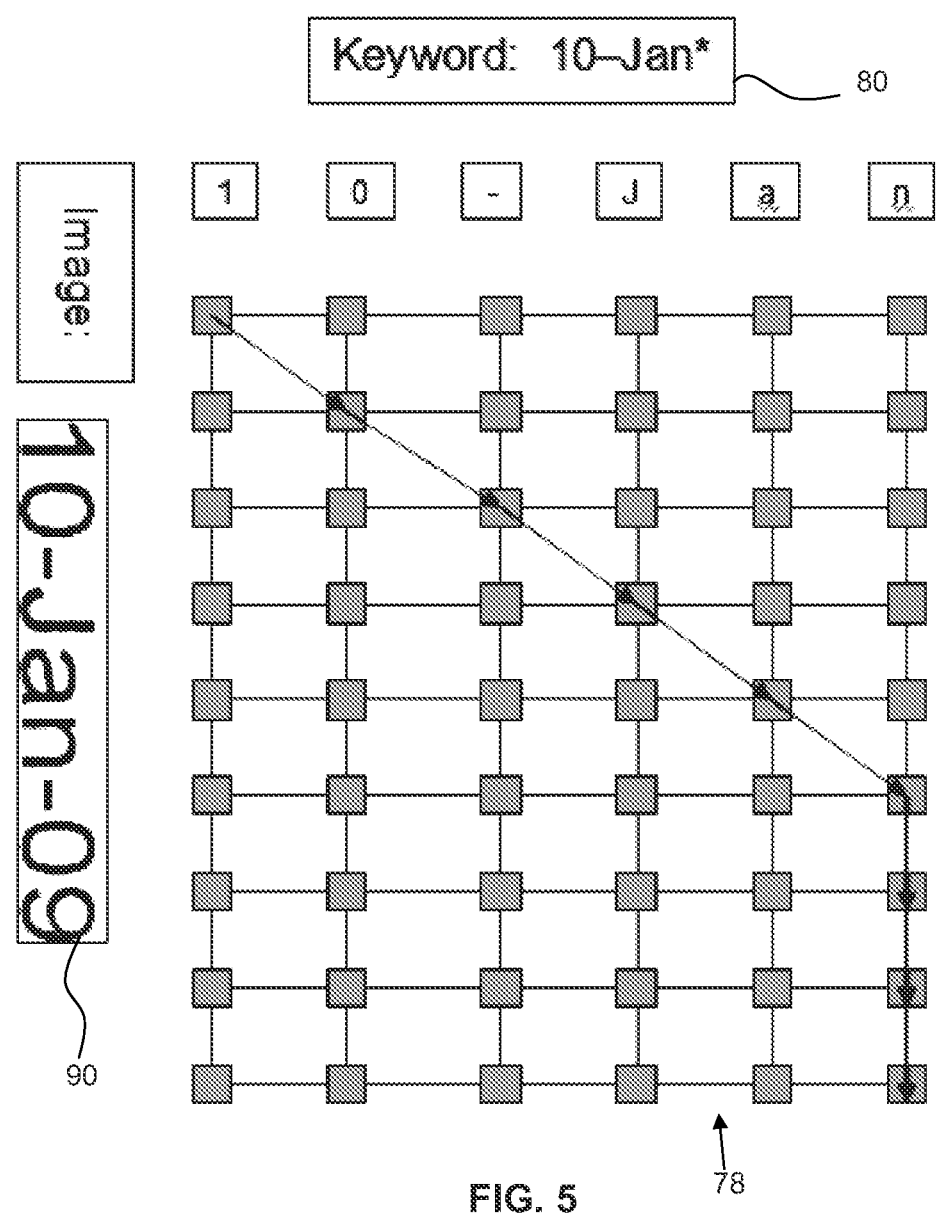
FIG. 5 illustrates the handling of a search query according to an embodiment wherein the search query contains a single wildcard character as a first or last character.

If the query is of the form str*, it is matched with the entire word image using DTW, and the optimal warping path is identified. FIG. 5 illustrates a scoring grid 78 for an example of matching the search query or keyword 80 "10-Jan*" with a word image 90 (containing the text "10-Jan-09"). By identifying the point where the optimal warping path touches the rightmost axis of the score matrix (as illustrated in FIG. 5), the cost of matching "str" with the corresponding connected components in the word image is obtained.

If the query is of the form *str, the above methodology is reversed and is matched with the reversed input vectors from the word images in the same fashion as mentioned above.

Second Approach (for Search Queries Like "*str*").

Figure 6:
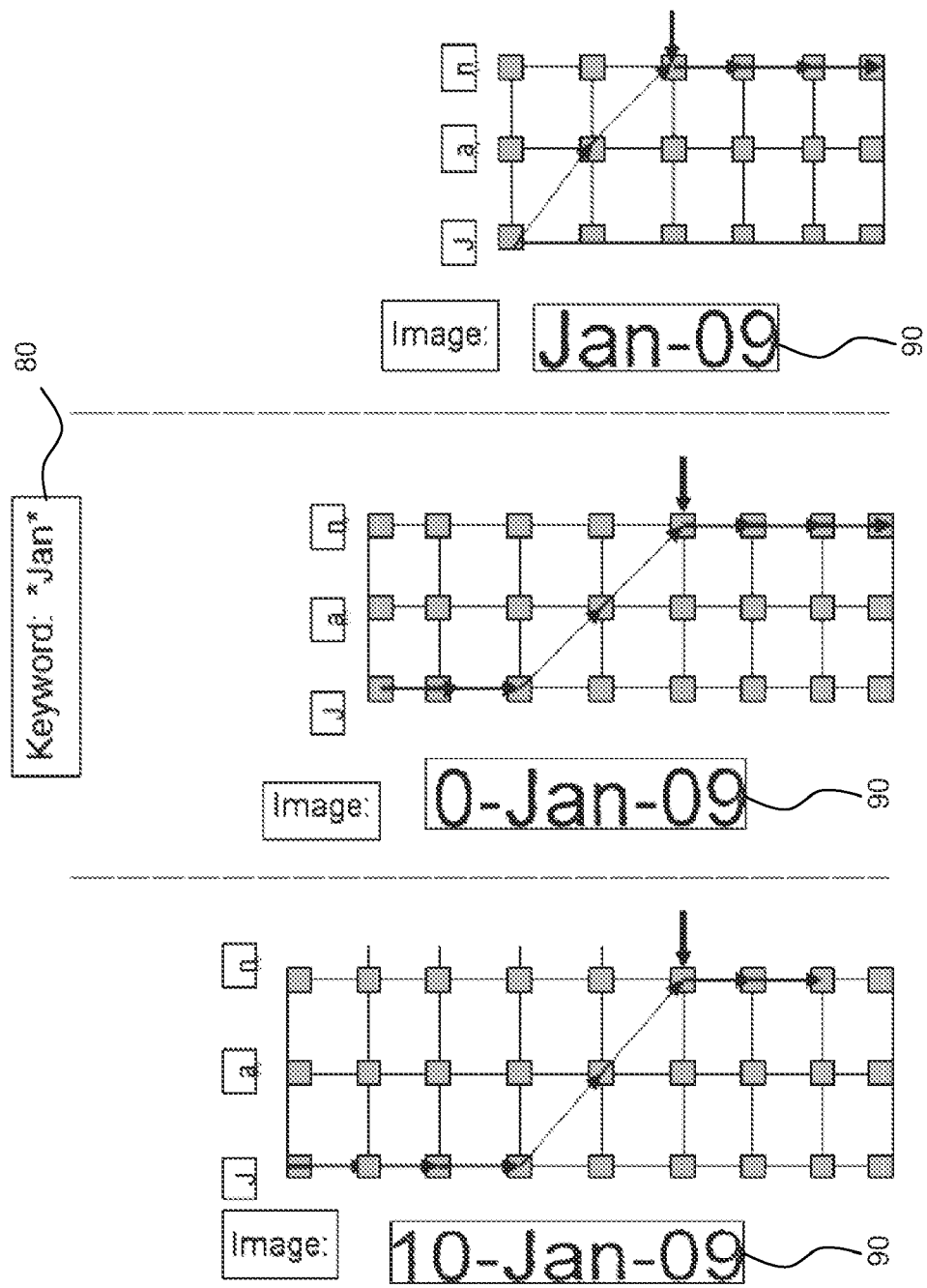
FIGS. 6A-6C illustrates the handling of a search query according to another embodiment wherein the search query contains two wildcard characters separated by one or more normal/accepted characters.

If the query is of the form *str*, the first approach mentioned above is not used because identification of the optimal warping path is problematic. Instead, the warping path is identified by matching the string with connected components in an iterative fashion. For example, first the string is matched with the entire connected component set from the word image (as shown in FIG. 6A), and then it is matched with the connected component set from the image beginning with the 2nd connected component from the previous one (as shown in FIG. 6B) and so on (as shown in FIG. 6C). In each of these cases the above-mentioned first approach is used to obtain the matching cost for that set of connected components and the minimum of these costs is taken as the correct matching cost for the string with the image.

It will be appreciated that, using a combination of the above mentioned two approaches, an embodiment can search a query containing one or more wildcards.

Embodiments may be captured in a computer program product for execution on the processor of a computer, e.g. a personal computer or a network server, where the computer program product, if executed on the computer, causes the computer to implement the steps of the method, e.g. the steps as shown in FIG. 1. Since implementation of these steps into a computer program product requires routine skill only for a skilled person, such an implementation will not be discussed in further detail for reasons of brevity only.

In an embodiment, the computer program product is stored on a computer-readable medium. Any suitable computer-readable medium, e.g. a CD-ROM, DVD, USB stick, Internet-accessible data repository, and so on, may be considered.

Figure 7:
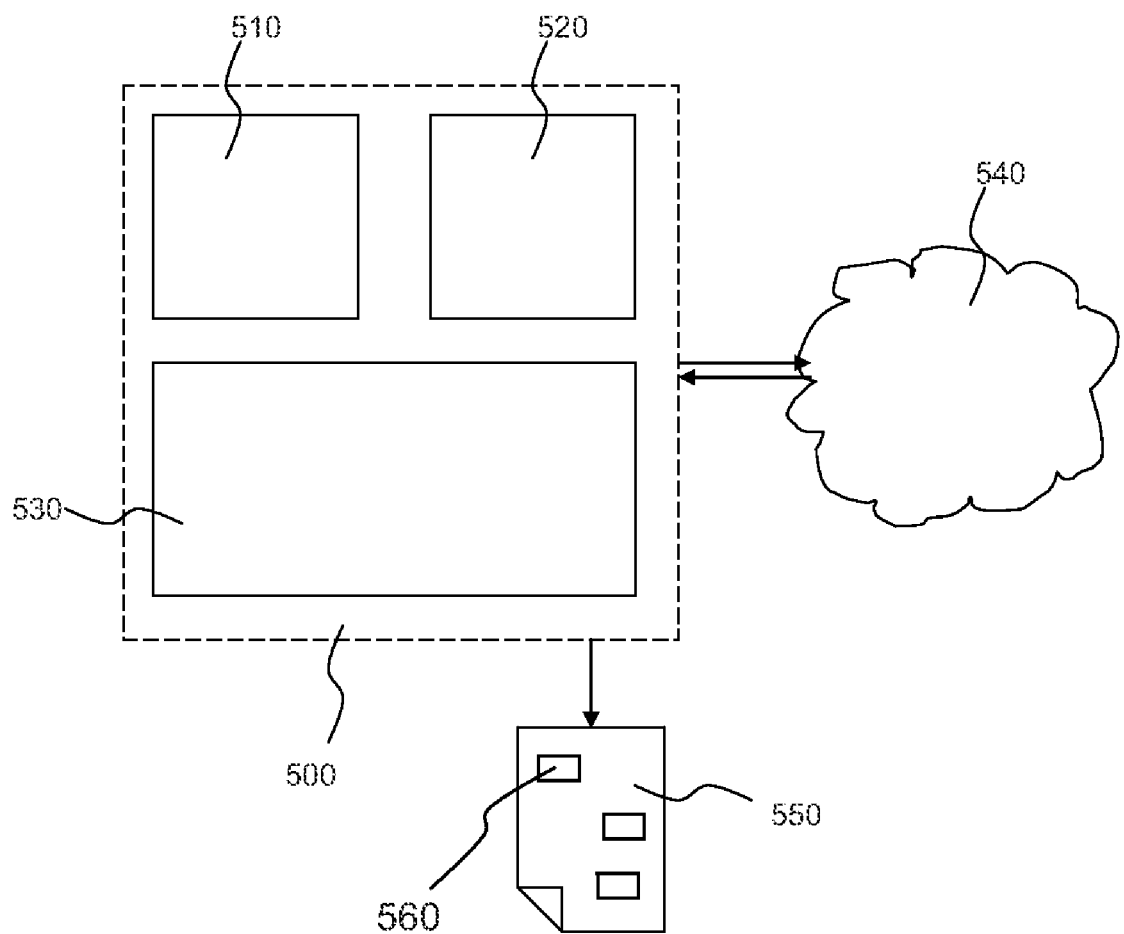
FIG. 7 schematically depicts a system for searching document images according to an embodiment.

In an embodiment, the computer program product may be included in a system for searching document images, such as a system 500 shown in FIG. 7. The system 500 comprises a user input module 510, which allows a user to tell the system 500 the text he wants the system 500 to search for within document images. The selection may be achieved by using any text input mechanism e.g. by pointing a mouse (not shown) and/or entering the text using a keyboard (not shown). The user input module 510 is also adapted to generate a template matrix from the user input text according to an embodiment.

The system 500 further comprises an image segmentation and classification module 520. The image segmentation and classification module 520 is adapted to segment a document image into components and generate a test matrix for a segmented component. The image segmentation and classification module 520 is also connected to a source of document images such as a network 540 (like the Internet or a company network, for example).

The user input module 510 is responsible for obtaining information relating to text that is of interest to the user, whereas the image segmentation and classification module 520 is responsible for obtaining information about the content of one or more document images that the user wishes to search.

In an embodiment, the user selection module 510 and the image portion selection module 520 may be combined into a single module, or may be distributed over two or more modules.

The system 500 further comprises a matching module 530 adapted to compare template and test matrices and to determine a similarity between user defined text and the content of a document image based in accordance with a proposed embodiment. The matching module is also adapted to present search results to the user or subsequent applications in any suitable form, e.g. digitally or in text form, e.g. on a computer screen or as a print-out 550 with the location(s) of text 560 matching the user input identified to the user.

It should be noted that the above-mentioned embodiments illustrate rather than limit embodiments, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. Embodiments can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of searching a digital image of a document for a predetermined keyword comprising one more keyword shapes, the method comprising the steps of:
    using a computer, identifying a word in the digital image, the word comprising one or more shapes;
    using a computer, generating a test matrix comprising a difference vector for each shape of the word, a difference vector representing the differences between the visual features of a respective shape and the visual features of a collection of reference shapes;
    using a computer, generating a template matrix comprising a difference vector for each keyword shape of the keyword; and
    using a computer, determining a measure of similarity between the word and the keyword by comparing the test matrix and the template matrix.

2. The method of claim 1, further comprising the step of:
    using a computer, determining a match between the word and keyword if the determined measure of similarity is equal to or greater than a predetermined threshold value.

3. The method of claim 1, wherein, when the predetermined keyword comprises a predetermined wildcard shape, the step of generating a template matrix comprises defining all of the components of the difference vector corresponding to the wildcard shape to be a predetermined value.

4. The method of claim 3, wherein the predetermined wildcard shape is "*" or "?", and wherein the predetermined value is zero.

5. The method of claim 1, wherein the step of determining a measure of similarity comprises using a dynamic time warping method to determine a warping distance between the test matrix and template matrix.

6. The method of claim 5, wherein the step of using a dynamic time warping method comprises calculating a dynamic time warping matrix representing the distance values between corresponding entries of the test matrix and template matrix.

7. The method of claim 1, wherein the step of generating a template matrix is based on a confusion matrix comprising confusion vectors, a confusion vector representing the probability that a respective shape is confused with shapes of the collection of reference shapes.

8. The method of claim 1, wherein the components of a difference vector comprise binary values.

9. The method of claim 1, wherein the collection of reference shapes comprises alphanumeric characters.

10. A method of determining the presence of predetermined text in a digital image of a document comprising the steps of:
    using a computer, defining a keyword representing the predetermined text;
    searching the digital image for the defined keyword according to claim 1; and
    using a computer, determining the presence of the predetermined text based on the determined measure of similarity.

11. The method of claim 10, wherein the predetermined text is determined to be present in the digital image if the determined measure of similarity is equal to or greater than a predetermined threshold value.

12. The method of claim 10, further comprising the step of, using a computer, identifying the location of the predetermined text within the digital image if it is determined that the predetermined text is present within the digital image.

13. A non-transitory computer-readable medium having computer-executable instructions stored thereon that, if executed by a computer, cause the computer to implement the steps of:

identifying a word in the digital image, the word comprising one or more shapes;

generating a test matrix comprising a difference vector for each shape of the word, a difference vector representing the differences between the visual features of a respective shape and the visual features of a collection of reference shapes;

generating a template matrix comprising a difference vector for each keyword shape of a keyword; and determining a measure of similarity between the word and the keyword by comparing the test matrix and the template matrix.

\* \* \* \* \*